July 23, 1968
R. G. MAKI
3,393,860
CONTAINER COVER
Filed Oct. 7, 1966
2 Sheets-Sheet 1
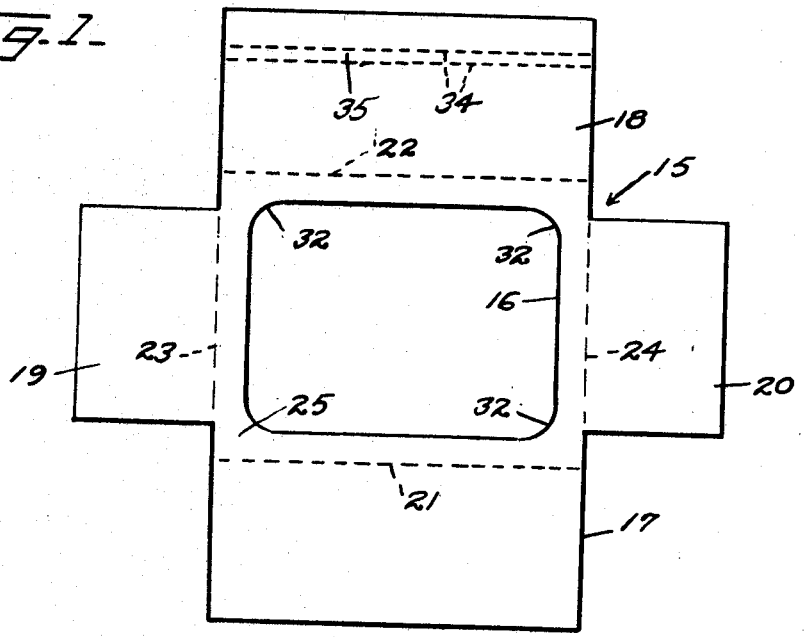
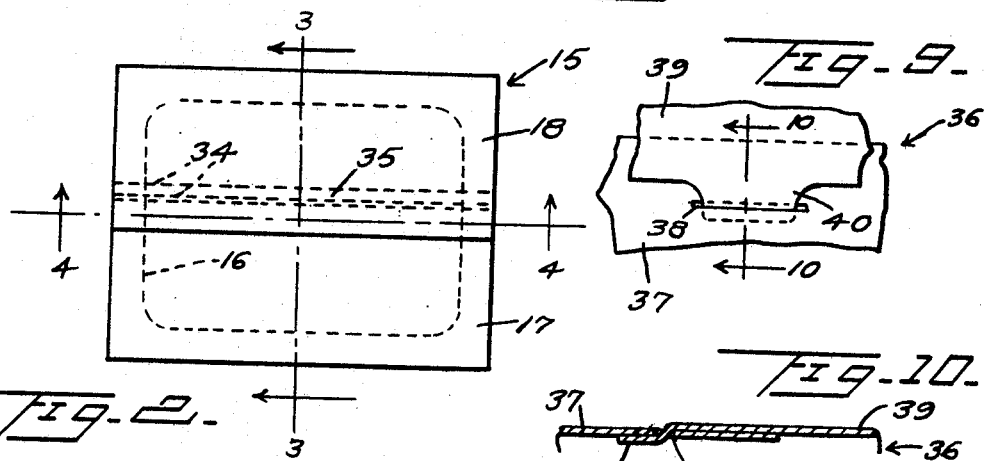
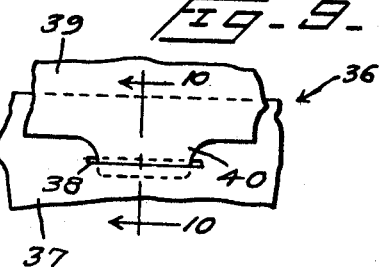
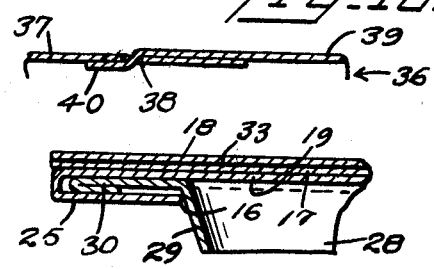
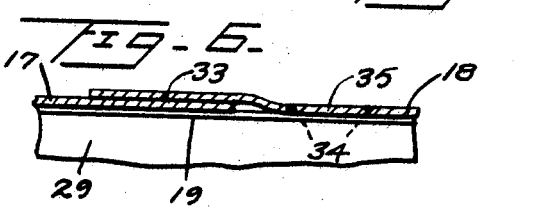
INVENTOR
ROBERT G. MAKI
BY John N. Randolph
ATTORNEY July 23, 1968 R. G. MAKI 3,393,860
CONTAINER COVER
Filed Oct. 7, 1966 2 Sheets-Sheet 2
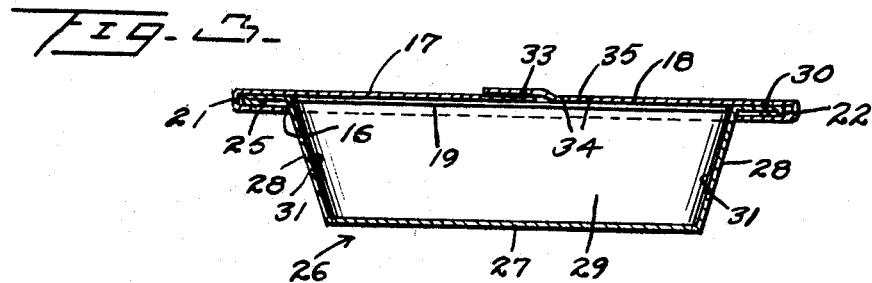
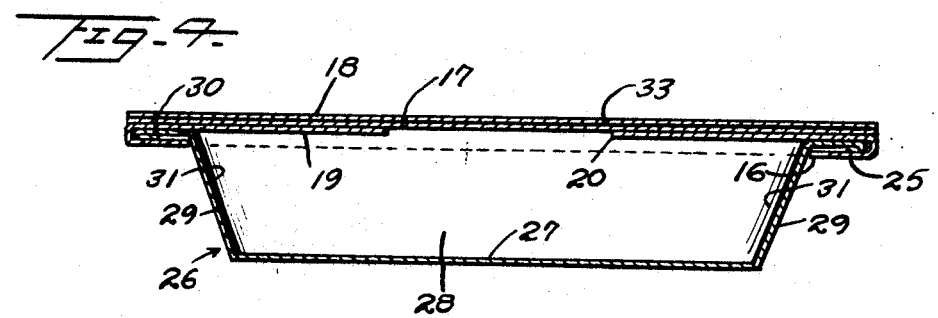
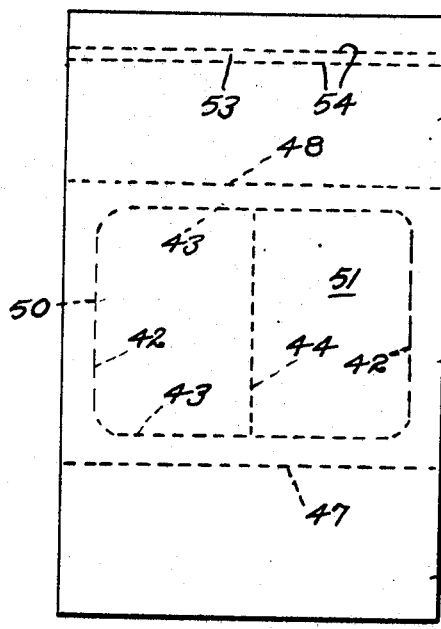
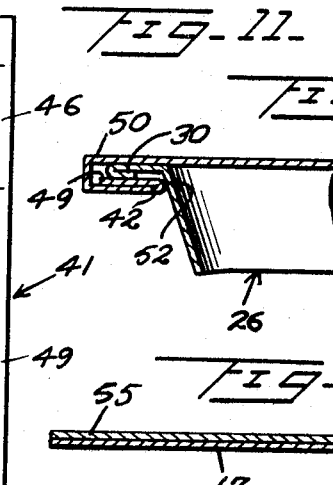
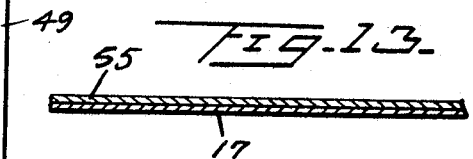
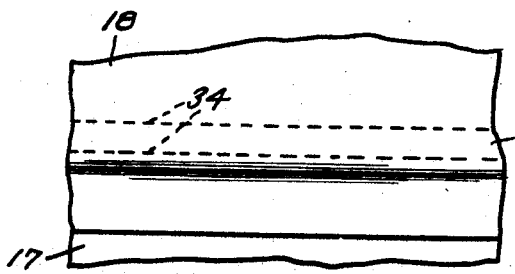
INVENTOR
ROBERT G. MAKI
BY John N. Randolph
ATTORNEY

United States Patent Office 3,393,860
Patented July 23, 1968

3,393,860
CONTAINER COVER
Robert G. Maki, 2336 Alta Ave.,
Louisville, Ky. 40205
Filed Oct. 7, 1966, Ser. No. 585,079
6 Claims. (Cl. 229—44)

ABSTRACT OF THE DISCLOSURE

A cover for closing an open top container and which is capable of becoming a carrier for the container in an uninterrupted movement through a standard cartoning machine of a production line and where the cover is closed and sealed over the open top of the container. The cover engages a flange surrounding the open top of the container and is not secured directly to the container so that it may be readily opened and removed.

---

This invention relates to a novel cover for open top containers, such as trays or pans of aluminum foil and plastic or those made of other metallic substances and which are primarily used for holding food products, such as frozen foods and bakery products, but which is also adapted for use in closing containers for other items, such as hardware items.

One object of the invention is to provide a cover which is capable of becoming a carrier for the container on a production line and enables the container and cover to move with an uninterrupted motion through a standard cartoning machine, during which the cover is closed and sealed over the open top of the container.

Another object of the invention is to provide a closure or cover which extends completely over the flange of the open top of the tray or pan, affording a maximum area to receive printed matter descriptive of the product contained in the pan and which is being marketed.

A further object of the invention is to provide a closure or cover which is not secured directly to a pan or tray and which provides means to enable the cover to be readily opened and removed from the pan or tray by the ultimate consumer without risk of injury to the fingers or fingernails, and with a minimum of effort.

A further object of the invention is to provide a closure or cover which, when applied to the open top of a pan or tray, will afford much greater stacking strength than is afforded by closures now being used for such containers.

Various other objects and advantages of the invention will hereinafter become more fully apparent from the following description of the drawings, illustrating presently preferred embodiments thereof, and wherein:

FIGURE 1 is a plan view of a preferred form of the extended cover, comprising the invention;

FIGURE 2 is a top plan view showing the cover applied and sealed to a conventional pan or tray;

FIGURE 3 is an enlarged cross sectional view taken substantially along a plane as indicated by the line 3—3 of FIGURE 2;

FIGURE 4 is a longitudinal sectional view taken substantially along a plane as indicated by the line 4—4 of FIGURE 2;

FIGURE 5 is an enlarged fragmentary sectional view taken substantially along a plane corresponding to the plane of FIGURE 3;

FIGURE 6 is an enlarged fragmentary sectional view illustrating another part of the structure as shown in FIGURE 3;

FIGURE 7 is an enlarged fragmentary sectional view taken along a plane corresponding to the plane of FIGURE 4 and illustrating a detail thereof;

FIGURE 8 is a fragmentary top plan view of a portion of the sealed cover;

FIGURE 9 is a fragmentary top plan view of a slightly modified embodiment of the cover, shown in a closed position;

FIGURE 10 is an enlarged sectional view thereof, taken substantially along a plane as indicated by the line 10—10 of FIGURE 9;

FIGURE 11 is a top plan view of another embodiment of the cover, shown in an extended position;

FIGURE 12 is a vertical sectional view showing a portion of the cover of FIGURE 11, applied to an open top pan or tray; and FIGURE 13 is a fragmentary sectional view of another embodiment of the cover.

Referring more specifically to the drawings, and first with reference to FIGURES 1 to 8, the cover, comprising the invention, as illustrated therein, is designated generally 15 and comprises a single substantial flat board member formed of paper, known as "sanitary food board" and which may vary in thickness between .008 inch and .025 inch. The cover 15 has a central opening 16, side flaps 17 and 18, and end flaps 19 and 20. The flaps 17, 18, 19 and 20 are adapted to be folded relative to the central portion of the cover along fold lines 21, 22, 23 and 24, respectively, which fold lines are spaced from the opening 16 to provide a marginal central portion 25 between said opening 16 and the flaps. The cover 15 is adapted to be applied to a conventional open top pan or tray 26 which may be formed of aluminum foil, plastic or other substance, and which has a substantially flat bottom 27, flared corresponding side walls 28, flared corresponding end walls 29, a surrounding horizontal top flange 30, which extends outwardly from the upper edges of the side walls 28 and end walls 29, and rounded corners 31.

The pan or tray 26 is placed in the opening 16 of the cover 15, which opening has rounded corners 32 to conformably engage the rounded pan corners 31, when the central portion 25 of the cover is disposed beneath and adjacent the flange 30. The two end flaps 19 and 20 are then folded upwardly and inwardly along their fold lines 23 and 24, respectively, over portions of the top flange 30 and over end portions of the open top of the pan 26. The side flap 17 is then folded upwardly and inwardly over another part of the flange 30 and over portions of the end flaps 19 and 20, and an adhesive 33 is applied to the then upper side of the flap 17 from end-to-end thereof and adjacent its free edge. The other side flap 18 is then folded upwardly and inwardly in the same manner to overlie other parts of the end flaps. The flaps 17 and 18 are of a length so that the free edge of the flaps 18 will overlie the adhesively coated area 33 of the flap 17 to which it is adhesively secured in any conventional manner, as by the application of pressure or pressure and heat, to effectively seal the cover 15 over the open top of the pan 26 to close and seal the contents, not shown, of said pan.

It will be readily apparent that the portions of the surfaces of the flaps 17 and 18 which are exposed after sealing, as seen in FIGURE 2, provide a large area to contain advertising material and other printed matter relating to the contents of the sealed package composed of said cover 15 and pan 26.

It will also be apparent that the sealed cover is not secured directly to any part of the pan. The flap 18, adjacent the portion thereof which is adhesively secured to the flap 17, is provided with two rows of perforations 34 which extend from end-to-end thereof and which provide a tear strip 35 therebetween, which may be readily removed in a conventional manner for severing the flap 18 between its fold line 22 and its free edge, so that the flaps can be readily opened and the cover detached from the pan without risk of injury to the fingers or fingernails, as commonly occurs when removing covers which are crimped to pan flanges.

FIGURES 9 and 10 illustrate a slightly modified embodiment of the cover generally designated 36 and which differs from the cover 15 only in that the side flap 37, which replaces the side flap 17, is not provided with an adhesive coating but instead is provided with a longitudinally extending slit 38. The flap 39, which replaces the flap 18, is not provided with a tear strip 35 but has a tongue 40 which projects from a portion of its free edge and which is passed through the slit 38 for closing the cover 36 without actually sealing said cover. The cover 36 may be advantageously employed in connection with carry-out food items which are intended to be consumed shortly after being packaged and wherein facilities are not available for sealing the cover and the sealing thereof is unnecessary.

FIGURES 11 and 12 illustrate a modified cover or closure, designated generally 41, having a central portion defined by two substantially parallel fold lines 42, two substantially parallel scored lines 43, and a scored line 44, which extends between the scored lines 43 and which it is disposed between and substantially parallel to the fold lines 42. One end of the cover 41 constitutes a side flap 45, corresponding to the flap 17, and the other end of the cover constitutes a flap 46, corresponding to the flap 18. The flap 45 has a fold line 47 spaced from the adjacent scored line 43 and the flap 46 has the fold line 48 spaced from the other scored line 43. The cover portion disposed between the fold lines 47 and 48 and the scored lines 43 and between the fold lines 42 and the side edges of the cover member forms a central surrounding portion 49, corresponding to the portion 25.

The cover 41 is severed along the scored lines 43 and 44 to provide two flaps 50 and 51 which replace the end flaps 19 and 20, respectively, and which are folded downwardly and outwardly along their fold lines 42 to form a central opening 52, as seen in FIGURE 12, corresponding to the opening 16 and in which the pan 26 is received. The two end flaps 50 after being folded downwardly and outwardly are folded upwardly and inwardly over the flange 30, after which the cover 41 is closed and sealed in the same manner as the cover 15, and may be unsealed and opened by disengaging the tear strip 53 of the flap 46 along the scored lines 54.

FIGURE 13 illustrates a portion of any one of the covers, as for example, a portion of the flap 17 which has on one side thereof a ply 55, preferably of aluminum foil, or which could be a plastic coating, and which is disposed on the exterior of the cover, when closed and sealed, to render it heat resistant and to prevent the board cover from picking up moisture.

It will be readily apparent the cover may be constructed to accommodate pans or trays of different shapes and sizes and various other modifications and changes are contemplated and may be resorted to without departing from the function or scope of the invention as hereinafter defined by the appended claims.

I claim as my invention:

1. A cover for an open top receptacle comprising a flat sheet-like member having a central opening adapted to receive an open top receptacle and having a central portion surrounding said opening and adapted to be disposed beneath a horizontal top flange of the receptacle, said cover having end flaps struck out of said central portion to form said central opening and including portions folded inwardly over portions of the top flange and portions of the open top of the receptacle, said cover having side flaps extending outwardly from opposite edges of said central portion and folded inwardly over other portions of the top flange and over said portions of the end flaps, said side flaps being of a length such that a portion of one of said side flaps overlaps a portion of the other side flap, and means for connecting said side flaps to one another for closing the cover over the open top of the receptacle.

2. A cover as in claim 1, said means comprising an adhesive for securing said overlapping portions together for sealing the cover over the receptacle.

3. A cover as in claim 2, and means for severing one of said side flaps for opening the cover.

4. A cover as in claim 3, said means for severing one of the side flaps comprising a tear strip formed therein and extending from end-to-end thereof.

5. A cover as in claim 1, said means for securing the side flaps together comprising a slit formed in one of said side flaps and a tongue forming an extension of the other side flap and engageable through said slit.

6. A cover as in claim 1, said end flaps including other portions extending outwardly from parts of the central opening and disposed beneath parts of the central portion.

References Cited

UNITED STATES PATENTS

| | | | |
|---|---|---|---|
| 2,218,509 | 10/1940 | Goodyear | 229—51 |
| 3,233,819 | 2/1966 | Flaherty | 229—43 |

FOREIGN PATENTS

| | | |
|---|---|---|
| 831,550 | 3/1960 | Great Britain. |
| 1,124,150 | 6/1956 | France. |

DONALD F. NORTON, *Primary Examiner.*